United States Patent Office 3,267,178
Patented August 16, 1966

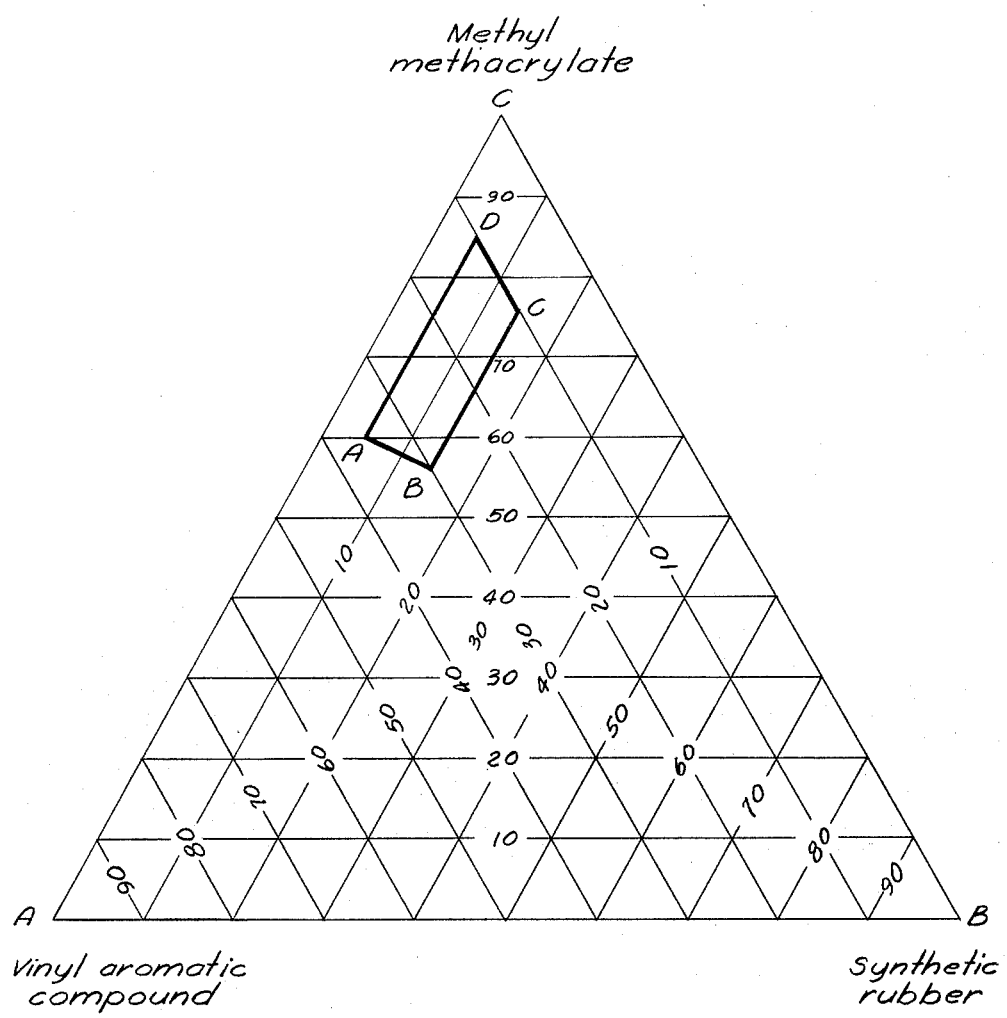

3,267,178
METHOD OF MAKING INTERPOLYMERS OF MONOVINYL AROMATIC COMPOUNDS, METHYL METHACRYLATE AND RUBBERY BUTADIENE POLYMERS
Lieng-Huang Lee, Midland, Mich., assignor to The Dow Chemical Company, Midland, Mich., a corporation of Delaware
Filed Dec. 26, 1962, Ser. No. 247,193
6 Claims. (Cl. 260—880)

This invention concerns new polymeric compositions comprising interpolymers or graft copolymers of one or more monovinyl aromatic compounds, methyl methacrylate and an elastomeric or rubbery butadiene polymer and pertains to a method of making the same. It relates more particularly to such interpolymeric compositions containing in chemically combined form a predominant amount of methyl methacrylate which possess good mechanical properties and in addition have a high degree of transparency.

It is known to prepare polymeric compositions based on blends or mixtures of a major portion of a transparent resin such as poly-methyl methacrylate or copolymers of styrene and methyl methacrylate, and a minor proportion of a transparent graft copolymer made by the emulsion polymerization of methyl methacrylate or styrene or a mixture of such monomers in a latex of polybutadiene or a rubbery copolymer of butadiene with a mono-olefin containing at least 60 percent of butadiene, see Canadian Patent No. 643,619.

Such heretofore known mixtures or blends of polymeric ingredients, while forming compositions suitable for a variety of purposes, suffer from the disadvantage that the transparency is frequency muddied by emulsifier residues remaining in the latex prepared graft copolymer ingredient and renders the compositions less useful for a variety of purposes for which they are otherwise well suited.

It has now been discovered that thermoplastic polymer compositions comprising interpolymers or graft copolymers prepared by polymerizing a liquid mixture of polymerizable ingredients comprising a solution of a predominant amount of methyl methacrylate, a vinyl aromatic compound and a minor amount of a rubbery butadiene polymer, by a procedure as hereinafter described, not only possess good mechanical properties such as tensile strength, elongation, impact strength and heat distortion temperature, but also possess a high degree of transparency which renders the polymeric compositions useful for a variety of purposes, in the home and industry, e.g. as lenses for stop-lights or parking lights on automobiles or signal lights.

The rubbery butadiene polymer starting material can be an elastomeric butadiene polymer containing at least 60 percent by weight of butadiene chemically combined in the polymer, such as polybutadiene or copolymers of butadiene and styrene. The rubbery butadiene polymers are preferably stereospecific butadiene polymers such as polybutadiene or copolymers of butadiene and styrene prepared by polymerization of the monomer in the presence of, or in contact with, a stereospecific catalyst such as butyl lithium, aluminum alkyls, or mixtures of aluminum alkyls and titanium trichloride or titanium tetrachloride to form polymers containing a high proportion, e.g. 30 percent or more of butadiene chemically combined in the cis-1,4 configuration with not more than about 70 percent of the butadiene in the trans-1,4 configuration. Stereospecific polybutadiene rubbers and rubbery copolymers of butadiene and styrene are known and are available on the open market. The stereospecific butadiene polymers can be of narrow or of broad molecular weight distribution and usually have a Mooney number of from about 10 to 60 as determined on a Mooney plastometer at ML(1+4) 212° F. The rubbery butadiene polymer is employed in amounts corresponding to from 5 to 14 percent by weight, based on the sum of the weights of the butadiene polymer, the methyl methacrylate and the vinyl aromatic compound(s) and within the area defined by the lines ABCD of the drawing.

The vinyl aromatic monomers to be employed are monovinyl aromatic compounds of the benzene series having the general formula

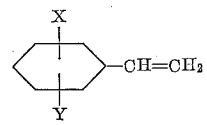

wherein X and Y are each independently selected from the group consisting of hydrogen, halogen and lower alkyl radicals. Among suitable monovinyl aromatic compounds are styrene, vinyltoluene, vinylxylene, ethylstyrene, isopropylstyrene, diethylstyrene, chlorostyrene, dichlorostyrene, bromostyrene, fluorostyrene, ar-chloro-ar-ethylstyrene and mixtures of any two or more of such monovinyl aromatic compounds. The vinyl aromatic compounds can be used in amounts of from 10 to 35 percent by weight of the sum of the weights of the vinyl aromatic compound, the methyl methacrylate and the rubbery butadiene polymer employed, and in proportions within the area defined by the lines ABCD of the drawing.

The methyl methacrylate is employed in amounts corresponding to from 56 to 85 percent by weight of the sum of the weights of the methyl methacrylate, the vinyl aromatic compound and the rubbery butadiene polymer, and within the area defined by the lines ABCD of the drawing. Up to ten percent by weight of the sum of the weights of the methyl methacrylate and the vinyl aromatic monomers can be replaced with other ethylenically unsaturated polymerizable monomer such as methyl acrylate, methacrylic acid, acrylic acid, itaconic acid, acrylonitrile, and the like, in making the new compositions.

The new interpolymer or graft copolymer compositions are prepared by dissolving or dispersing the rubbery butadiene polymer in the monomers to form a homogeneous solution or dispersion that is free or substantially free from gels, and polymerizing the monomers by heating the liquid first in mass, while agitating and subjecting the body of the liquid to shearing agitation sufficient to maintain the polymer, and the polymer being formed therein, uniformly dispersed throughout in the form of small particles of sizes not greater than 10 microns, preferably 5 microns or smaller, until the liquid contains from 20 to 40, preferably from 25 to 35, percent by weight of solids, and such that the partially polymerized liquid is a stable dispersion of the finely divided polymer which does not separate upon standing at room temperature and atmospheric pressure for a period of at least 24 hours, then heating the partially polymerized liquid while suspended in an inert aqueous medium at elevated temperatures to substantially completely polymerize the remaining monomers.

The partial or prepolymerization step can be carried out at temperatures between 60° and 150° C., preferably from 80° to 120° C., and at atmospheric, subatmospheric or superatmospheric pressures. The polymerization is preferably carried out in the absence of air or oxygen, or with only limited access of air such as by way of air through a reflux condenser, to the reacting mass. The polymerization can be initiated with peroxy compounds such as acetyl peroxide, benzoyl peroxide, di-tert.-butyl peroxide, tert.-butyl hydroperoxide, di-cumyl peroxide, cumene hydroperoxide, tert.-butyl peracetate, tert.-butyl perbenzoate or di-tert.-butyl diperphthalate, but such polymerization initiators are not required.

The partially polymerized solution is a stable dispersion of polymer in the desired particle size, i.e. of substantially uniform polymer particles of sizes not greater than five microns, uniformly dispersed in the remaining monomers. It does not readily separate into two phases or become non-uniform in composition upon standing at ordinary conditions for 24 hours or longer. Thus, the prepolymerided solution can be stored for reasonable periods of time and subsequently heated at elevated temperatures and pressures to complete or substantially complete the polymerization of the remaining monomers and produce the new compositions of the invention.

The partially polymerized solution containing polymer in the form of fine particles not exceeding ten microns in size is further polymerized by heating the same at temperatures between 80° and 180° C. while suspended as droplets in an inert aqueous medium at superatmospheric pressures at least as great as the autogeneous pressure of the mixture, e.g. by heating the same in a closed vessel, preferably in the absence or substantial absence of air or oxygen. Higher pressures may be used such as by pressurizing the vessel containing the aqueous suspension with an inert gas, e.g. nitrogen, methane, helium or argon, suitably at from 5 to 100 pounds per square inch gauge pressure or higher prior to heating the materials to complete the polymerization.

The suspending or dispersing agent can be any of a variety of water soluble dispersing agents known to the art such as alkali salts of sulfonated polystyrene or sulfonated polyvinyltoluene, polyacrylic acid, polyacrylamide, methyl cellulose, hydroxy ethyl cellulose, water soluble interpolymers of acrylic acid or methacrylic acid and 2-methylhexylmethacrylate, or carboxymethyl methyl cellulose. The alkali metal salts, e.g. the sodium or potassium salts, of carboxymethyl methyl cellulose such as a cellulose derivative having an average of about 0.25 —OCH$_2$COOH group and about 1.8 —OCH$_3$ groups per mole of cellulose, is preferred and is advantageously employed as the dispersing agent in carrying out the aqueous suspension polymerization since the alkali salts of such cellulose derivatives do not tend to gel upon heating at elevated temperatures. The carboxymethyl methyl cellulose or alkali salt thereof, should have a viscosity of from about 1000 to 3000 centipoises as determined for a 2 weight percent solution of the material in water at 25° C. The material can be used in amounts corresponding to from about 0.2 to 5, preferably from 0.25 to 2.5 percent by weight of the water used.

In general an amount of the aqueous medium corresponding to from one to two times the volume or weight of the prepolymerized solution starting material is usually employed, although smaller or larger quantities of aqueous medium can be used.

After completing or substantially completing polymerization of the monmers the polymer is recovered in usual ways, e.g. it is separated by filtering and is washed with water and dried. In a preferred embodiment the polymer is devolatilized by feeding the same to a plastics extruder wherein it is heated to a molten condition and is subjected to subatmospheric pressure, i.e. it is passed in molten condition through a section of the extruder wherein volatile ingredients are vaporized and removed from the polymer under vacuum, then is extruded as a thin sheet or a plurality of strands which are cooled and cut to a granular form suitable for molding.

The following examples illustrate ways in which the principle of the invention has been applied, but are not to be construed as limiting its scope.

EXAMPLE 1

In each of a series of experiments, a stereo-specific polybutadiene rubber having a Mooney number of 35, ML(1+4) 212° F., which polybutadiene consisted of over 90 percent 1,4-addition polymer with about 7.5 percent of 1,2-polymer and having between 32 and 35 percent of cis-1,4 configuration and which polybutadiene was of narrow molecular weight distribution, was dissolved in a mixture of methyl methacrylate and styrene to form a solution of the ingredients in proportions as stated in the following table. The solution was stirred and heated at a temperature of 110° C. for a period of from 6 to 10 hours, in a closed two gallon capacity pressure resistant reaction vessel equipped with an agitator and a baffle for producing a shearing agitation on the solution while polymerizing the monomers until the solution contained from about 28.5 to 30 percent by weight of solids, and a viscous liquid containing the polymer in the form of fine particles of sizes not greater than about 5 microns and stable against separating into two phases upon standing at room temperature, was obtained. The prepolymerized or partially polymerized solution was suspended in 1.5 times its weight of an aqueous solution of water containing 1.33 percent by weight of crude sodium carboxymethyl methyl cellulose consisting of one-third part by weight of sodium carboxymethyl methyl cellulolse, a cellulose derivative having an average of 0.25 —OCH$_2$COOH group and 1.8 —OCH$_3$ groups per mole of cellulose, one-third part by weight of sodium chloride and one-third part by weight of water, which crude sodium carboxymethyl methyl cellulose had a viscosity of 1700 centipoises as determined for a 2 weight percent solution of said material in water at 25° C., as dispersing agent. The resulting mixture was placed in a closed pressure resistant reaction vessel, under 50 pounds per square inch gauge pressure of nitrogen gas at room temperature, and was stirred and heated under time and temperature conditions as follows: 4 hours at 130° C.; 4 hours at 140° C.; and 4 hours at 150° C., to complete polymerization of the monomers. The polymer product was obtained in the form of fine beads. The polymer was separated by filtering and was washed with water and dried. Portions of the polymer were compression molded at 420° F. and 700 pounds per square inch gauge pressure to form a flat sheet one-eighth inch thick. Test bars of ⅛ x ½ inch cross section were cut from the molded sheet. These test bars were used to determine tensile strength and percent elongation values for the polymer employing procedures similar to those described in ASTM D638–57T. Impact strength was determined by procedure similar to that described in ASTM D256–57T. Other test bars were used to determine a Vicat softening point for the polymer and a light transmission or transparency value. A procedure for determining light transmission was to measure the amount of light of wave lengths between 420 and 620 millimicrons transmitted through a test bar of the polymer and thereafter calculate the percent of light transmitted employing the equation:

$$\text{Percent light transmission} = \frac{K_{620} - K_{420}}{K_{620}} \times 100$$

More frequently, the light transmission was determined by visual observation. Table I identifies the experiments and gives the proportions of methyl methacrylate, styrene and polybutadiene rubber, employed in making the polymer. The table also gives the percent by weight of solids in the prepolymer or partially polymerized solution, which prepolymerization was carried out in mass with agitation at agitator speed in r.p.m. as stated in the table, and the particle size of the polymer therein. The table gives the properties determined for the product.

*Table I*

| Run No. | Starting Materials, percent | | | Prepolymer Solution | | | Product | | | | | |
|---|---|---|---|---|---|---|---|---|---|---|---|---|
| | MMA | Styrene | Rubber | Polymerization Time, hrs. | Solids, percent | Agitation, r.p.m. | Tensile Strength, lbs./sq. in. | Elongation, percent | Modulus ×10⁵, lbs./sq. in. | Notched Impact Strength, ft.-lbs. | Vicat Softening Point, °C. | Light Transmission |
| 1 | 60.5 | 32.5 | 7 | 9.3 | 30 | 45 | 4,890 | 13.5 | 1.8 | 1.6 | 102 | Good. |
| 2 | 58.5 | 31.5 | 10 | 9.3 | 28.5 | 60 | 4,080 | 29.5 | 1.4 | 1.6 | 100 | Do. |
| 3 | 57.2 | 30.8 | 12 | 8 | 30.2 | 80 | 3,680 | 43.3 | 1.8 | 2.0 | 101 | Fair. |
| 4 | 79 | 14 | 7 | 13 | 31 | 60 | 5,220 | 10.9 | 3.1 | 1.2 | 102 | Excellent. |
| 5 | 76.5 | 13.5 | 10 | 10.75 | 29.8 | 60 | 4,770 | 23.5 | 2.8 | 2.0 | 100 | Do. |

EXAMPLE 2

In each of a series of experiments, a rubbery butadiene polymer as identified in the following table was dissolved in monomeric styrene and methyl methacrylate to form a solution consisting of 10 percent by weight of the butadiene polymer, 31.5 percent by weight of styrene and 58.5 percent by weight of methyl methacrylate. To the solution there was added 0.2 percent by weight of 2,6-di-tert.-butyl-4-methyl phenol as antioxidant. The solution was stirred and heated at a temperature of 110° C. in mass in a two gallon capacity pressure resistant vessel similar to that employed in Example 1, to partially polymerize the monomers and form a solution containing approximately 30 percent by weight of solids or polymer in the form of fine particles. The partially polymerized solution was stirred and heated in admixture with an aqueous medium to complete the polymerization in aqueous suspension and to obtain the polymer in the form of rounded beads, employing procedure similar to that employed in Example 1. Table II below identifies the experiments, and gives the properties determined for the polymer or product.

*Table II*

| Run No. | Rubber | | Polymer Solution | | | Product | | | | | |
|---|---|---|---|---|---|---|---|---|---|---|---|
| | Kind | Mooney No. | Polymerization Time, hrs. | Solids, Percent | Particle Size, microns | Tensile Strength, lbs./sq. in. | Elongation, Percent | Modulus ×10⁶ lbs./sq. in. | Notched Impact Strength, ft.-lbs. | Vicat Softening Point,° C, | Light Transmission |
| 1 | Polybutadiene C.F.ª | 35 | 12.5 | 29 | <5 | 4,540 | 27.3 | 3.1 | 1.9 | 100 | Fair. |
| 2 | Polybutadiene N.F.ᵇ | 35 | 10.6 | 29 | <5 | 5,010 | 45.7 | 2.8 | 2.4 | 105 | Do. |
| 3 | GR-S1006 ᶜ | 50 | 6.5 | 29.6 | <5 | 5,280 | 36.5 | 3.1 | 2.6 | 103 | Excellent. |
| 4 | Polybutadiene cis-4.ᵈ | 35 | 9.25 | 28.8 | <5 | 3,430 | 2.2 | 2.9 | 4.4 | 101 | Good. |
| 5 | Krylene 602 ᵉ | 55 | 7 | 28.6 | <5 | 3,730 | 4.8 | 2.5 | 2.4 | 100 | Do. |
| 6 | 95%-butadiene ᶠ | | 11.5 | 30 | <5 | 4,660 | 31.1 | 2.9 | 2.4 | 100 | Do. |
| 7 | 75-butadiene, 25-styrene.ᵍ | 45 | 7.75 | 31.2 | <3 | 4,880 | 10.3 | 3.3 | 3.0 | 100 | Excellent. |

ª An amorphous stereospecific polybutadiene rubber free of gel consisting of over 90 percent 1,4-addition and only 7.5 percent vinyl structure. The cis-1,4 configuration comprises 32 to 35 prcent of the polymer. It is subject to cold flow, and is of narrow molecular weight distribution.
ᵇ Similar to (a), but does not cold flow.
ᶜ An emulsion hot rubber consisting of a copolymer of approximately 76.5 percent butadiene and 23.5 percent styrene.
ᵈ An amorphous stereospecific polybutadiene rubber consisting of 90 percent or more of cis-1,4 addition polymer.
ᵉ An emulsion cold rubber consisting of a copolymer of approximately 78 percent by weight of butadiene and 32 percent styrene.
ᶠ An emulsion copolymer of 95 percent by weight of butadiene and 5 percent of styrene.
ᵍ A stereospecific rubber consisting of a copolymer of about 75 percent butadiene and 25 percent styrene.

EXAMPLE 3

In each of a series of experiments, a stereo-specific polybutadiene rubber similar to that employed in Example 1, was dissolved in a mixture of methyl methacrylate and styrene to form a solution of the ingredients in proportions as stated in the following table. To the solution was added 0.2 percent by weight of 2,6-di-tert.-butyl-4-methyl phenol as antioxidant. The solution was prepolymerized by heating the same in mass at a temperature of 110° C. with stirring employing procedure similar to that employed in Example 1. Completing of the polymerization was carried out in aqueous suspension employing procedure similar to that employed in Example 1. Table III identifies the experiments and gives the properties determined for the product.

*Table III*

| Run No. | Starting Materials, percent | | | Polymer Solution | | | Product | | | | | |
|---|---|---|---|---|---|---|---|---|---|---|---|---|
| | MMA | Styrene | Rubber | Polymerization Time, hrs. | Solids, percent | Agitation, r.p.m. | Tensile Strength, lbs./sq. in. | Elongation, percent | Modulus ×10⁵ lbs./sq. in. | Notched Impact Strength ft.-lbs. | Vicat Softening Point,° C. | Light Transmission |
| 1 | 69.7 | 23.3 | 7 | 11.3 | 28.4 | 60 | 5,020 | 11.8 | 3.1 | 1.2 | 100 | Excellent. |
| 2 | 60.5 | 32.5 | 7 | 9.3 | 30.0 | 45 | 4,890 | 13.5 | 1.8 | 1.6 | 102 | Good. |
| 3 | 67.5 | 22.5 | 10 | 11 | 31.0 | 60 | 4,670 | 31.8 | 2.6 | 2.0 | 103 | Excellent. |
| 4 | 58.5 | 31.5 | 10 | 18.5 | 28.5 | 60 | 4,080 | 29.5 | 1.4 | 1.6 | 100 | Good. |

EXAMPLE 4

In each of a series of experiments, a stereo-specific polybutadiene rubber similar to that employed in Example 1 was dissolved in a mixture of styrene and methyl methacrylate to form a solution consisting of 10 percent by weight of the polybutadiene rubber, 31.5 percent by weight of styrene and 58.5 percent by weight of methyl methacrylate. To the solution was added 0.2 percent by weight of 2,6-di-tert.-butyl-4-methyl phenol as antioxidant. The solution was prepolymerized to about 30 percent of solids by heating the same in mass at a temperature of 110° C. employing procedure similar to that employed in Example 1, and with stirring by rotating the agitator of the reaction vessel at speeds as stated in the following table. The partially polymerized solution was suspended in an aqueous medium and was polymerized employing procedure similar to that employed in Example 1. Table IV identifies the experiments and gives the properties determined for the product.

and styrene, or a mixture of methyl methacrylate, styrene and methacrylic acid to form a solution of the ingredients in proportions as stated in the following table. The solution was prepolymerized to about 30 percent by weight of solids in mass, then was further polymerized in aque-

*Table IV*

| Run No. | Prepolymerizing Conditions | | | Prepolymer Solution | | Product | | | | | |
|---|---|---|---|---|---|---|---|---|---|---|---|
| | Temp., °C. | Time, hrs. | Agitator speed, r.p.m. | Solids, Percent | Particle size, microns | Tensile Strength, lbs./sq. in. | Elongation, Percent | Modulus ×10$^5$, lbs./sq. in. | Notched Impact Strength, ft.-lbs. | Vicat Softening Point, °C. | Light Transmission |
| 1 | 110 | 7.3 | 30 | 29.5 | 5–7 | 3,680 | 34.1 | 2.7 | 1.7 | 97 | Fair. |
| 2 | 110 | 4.8 | 45 | 31.5 | 5 | 3,500 | 22.2 | 2.4 | 1.8 | 98 | Do. |
| 3 | 110 | 8 | 60 | 28 | 5 | 3,330 | 25.0 | 22 | 1.4 | 100 | Do. |
| 4 | 110 | 8.5 | 80 | 29 | 3–4 | 3,470 | 30.4 | 2.3 | 2.4 | 100 | Good. |
| 5 | 110 | 8.2 | 100 | 28.2 | 3–4 | 3,540 | 18.9 | 2.2 | 1.6 | 101 | Do. |

EXAMPLE 5

In each of a series of experiments, a stereo-specific polybutadiene rubber similar to that employed in Example 1, was dissolved in a mixture of styrene, methyl methacrylate and acrylonitrile to form a solution of the ingredients in proportions as stated in the following table. To the solution there was added 0.3 percent by weight of 2,6-di-tert.-butyl-4-methyl phenol as antioxidant. The solution was prepolymerized to about 30 percent solids by heating the same in mass at a temperature of 110° C. with stirring in a two gallon capacity reaction vessel with agitation to form a solution containing the polymer in particles of sizes between 3 and 5 microns employing procedure similar to that employed in Example 1. The prepolymerized solution was heated in aqueous suspension to complete the polymerization employing procedure similar to that employed in Example 1. Table V identifies the experiments and gives the properties determined for the product.

ous suspension employing procedures similar to those employed in Example 5. Table VI identifies the experiments and gives the properties determined for the product.

*Table VI*

| Run No. | Starting Materials, percent | | | | Prepolymer Solution | | Product | | | | | |
|---|---|---|---|---|---|---|---|---|---|---|---|---|
| | MMA | Styrene | Methacrylic acid | Rubber | Solids, percent | Agitation, r.p.m. | Tensile Strength, lbs./sq. in. | Elongation, percent | Modulus ×10$^5$, lbs./sq. in. | Notched Impact Strength, ft.-lbs. | Vicat Softening Point, °C. | Light Transmission |
| 1 | 58.5 | 31.5 | ------ | 10 | 28 | 60 | 3,300 | 25.0 | 2.2 | 1.4 | 100 | Fair. |
| 2 | 56.6 | 30.4 | ------ | 10 | 30 | 60 | 4,530 | 37.4 | 2.4 | 1.7 | 105 | Good. |
| 3 | 55.7 | 29.3 | 3 | 10 | 28.8 | 60 | 4,540 | 24.9 | 2.7 | 1.7 | 111 | Do. |
| 4 | 53.7 | 28.3 | 8 | 10 | 28 | 60 | 4,990 | 32.0 | 3.1 | 1.8 | 114 | Do. |
| 5 | 52.4 | 27.6 | 10 | 10 | 28.2 | 60 | 5,010 | 30.3 | 3.0 | 1.4 | 114 | Fair. |

EXAMPLE 7

In each of a series of experiments, a stereo-specific polybutadiene rubber similar to that employed in Example 1, was dissolved in a mixture of monomeric styrene and methyl methacrylate in proportions as stated in the following table. To the solution was added 0.2 percent by weight of 2,6-di-tert.-butyl-4-methylphenol as antioxidant. The solution was pre-polymerized by heating the same at a temperature of 110° C., and stirring with a shearing agitation until from 28 to 30 percent of polymer was obtained, then was further polymerized by heating the pre-polymerized solution in an aqueous suspension employing procedure similar to that employed in Example 1. Table VII identifies the experiments and gives the proportions of the starting materials employed to make

*Table V*

| Run No. | Starting Materials, percent | | | | Prepolymer Solution | | Product | | | | | |
|---|---|---|---|---|---|---|---|---|---|---|---|---|
| | MMA | Styrene | VCN | Rubber | Solids, percent | Agitation, r.p.m. | Tensile Strength, lbs./sq. in. | Elongation, percent | Modulus ×10$^5$, lbs./sq. in. | Notched Impact Strength, ft.-lbs. | Vicat Softening Point, °C. | Light Transmission |
| 1 | 58.5 | 31.5 | ------ | 10 | 30 | 60 | 4,710 | 42.6 | 3.0 | 2.3 | 99 | Good. |
| 2 | 56.6 | 30.4 | 3 | 10 | 29 | 60 | 4,480 | 41.8 | 3.0 | 2.7 | 97 | Fair. |
| 3 | 55.7 | 29.3 | 5 | 10 | 29 | 60 | 4,460 | 38.6 | 2.8 | 2.3 | 95 | Do. |
| 4 | 53.7 | 28.3 | 8 | 70 | 30 | 60 | 4,380 | 55.1 | 1.5 | 2.9 | 94 | Do. |
| 5 | 52.4 | 27.6 | 10 | 10 | 28.4 | 60 | 3,870 | 33.6 | 3.1 | 3.1 | 92 | Do. |

EXAMPLE 6

In each of a series of experiments, a stereo-specific polybutadiene rubber similar to that employed in Example 1 was dissolved in a mixture of methyl methacrylate the polymeric product. The table also gives the properties determined for the product. The proportions of the starting ingredients employed in the experiments are within the area defined by the points ABCD of the drawing.

Table VII

| Run No. | Starting Materials, Percent | | | Prepolymer Solution | | | Product | | | | | |
|---|---|---|---|---|---|---|---|---|---|---|---|---|
| | MMA | Styrene | Rubber | Polymerization Time, hrs. | Solids, Percent | Particle Size microns | Tensile Strength lbs./sq. in. | Elongation, Percent | Modulus ×10⁵ lbs./sq. in. | Notched Impact Strength, ft.-lbs. | Vicat Softening Point, °C. | Light Transmission |
| 1 | 85 | 10 | 5 | 12.75 | 29.2 | 1 | 6,300 | 9.0 | 3.3 | 0.8 | 103 | Excellent. |
| 2 | 60 | 35 | 5 | 11.25 | 29.8 | 2 | 5,860 | 6.1 | 3.1 | 1.1 | 103 | Good. |
| 3 | 76 | 10 | 14 | 10.5 | 28.4 | 1 | 4,310 | 14.1 | 2.5 | 2.2 | 105 | Fair. |
| 4 | 56 | 30 | 14 | 8 | 29.0 | 5 | 2,840 | 33.0 | 1.0 | 2.0 | 102 | Fair. |

EXAMPLE 8

In each of a series of experiments, a stereospecific polybutadiene rubber similar to that employed in Example 1, was dissolved in a vinyl aromatic compound in proportions and kind as stated in the following table. To the solution there was added 0.2 percent by weight of 2,6-di-tertiary-butyl-4-methylphenol as antioxidant and methyl methacrylate in amount as stated in the table. The resulting solution was prepolymerized by heating the same at a temperature of 110° C. and stirring with a shearing agitation until about 30 percent polymer was obtained, then was further polymerized by heating the prepolymerized solution in an aqueous suspension employing procedure similar to that employed in Example 1. Table VIII identifies the experiments and gives the proportions and kind of materials employed in making the polymeric product. The table also gives the properties determined for the product.

partially polymerized reaction mixture was added, as catalyst. Thereafter the resulting mixture was put under nitrogen pressure and was agitated and heated for four hours at 130° C., four hours at 140° C. and four hours at 150° C. The polymer was obtained in the form of small rounded beads. The polymer was washed and dried, then was fed to a plastics extruder wherein it was heated to a molten condition and was subjected to sub-atmospheric pressure as the molten polymer passed through a section of the extruder wherein volatile ingredients were vaporized in vacuum and were separated from the molten polymer, after which the polymer was extruded as a plurality of strands which were cooled and cut to a granular form suitable for molding. Portions of the devolatilized polymer were compression molded at 420° F. and 700 pounds per square inch gauge pressure to form sheets one-eighth inch thick. Test bars of ⅛ x ½ inch cross section were cut from the molded sheets. These test bars were Table VIII

| Run No. | Starting Materials | | | | Prepolymer Solution | | | Product | | | | | |
|---|---|---|---|---|---|---|---|---|---|---|---|---|---|
| | Vinyl Aromatic Compound | | MMA, Percent | Rubber, Percent | Polymerization Time, hrs. | Solids, Percent | Particle Size, Microns | Tensile Strength, lbs./sq. in. | Elongation, Percent | Modulus ×10⁵ lbs./sq. in. | Notched Impact Strength, ft.-lbs. | Vicat Softening Point, °C | Light Transmission |
| | Kind | Percent | | | | | | | | | | | |
| 1 | 65% meta-35% para-Vinyltoluene | | 31.5 | 58.5 | 10 | 7.5 | 28.2 | 5 | 4,230 | 21.6 | 2.4 | 1.5 | 93 | Fair |
| 2 | Orthovinyl-toluene | | 31.5 | 58.5 | 10 | 4.2 | 28.6 | 5 | 5,340 | 7.0 | 3.1 | 1.3 | 110 | Fair |
| 3 | Para-chloro-styrene | | 31.5 | 58.5 | 10 | 6 | 29.2 | 5 | 5,600 | 8.1 | 2.9 | 0.7 | 116 | Poor |
| 4 | 25% alpha-methylstyrene 75% styrene | | 31.5 | 58.5 | 10 | 10.2 | 28.0 | 5 | 3,730 | 3.6 | 2.5 | 2.9 | 101 | Poor |

EXAMPLE 9

Ten parts by weight of stereospecific polybutadiene rubber having a Mooney number of 35 and consisting of over 90 percent 1,4-addition polymer and about 7.5 percent 1,2-addition of vinyl polymer, with the cis-1,4-configuration comprising about 32 to 35 percent of the polymer, which polybutadiene rubber was of narrow molecular weight distribution, was dissolved in a mixture of 31.5 parts by weight of styrene and 58.5 parts by weight of methyl methacrylate, together with 0.2 percent based on the weight of the polybutadiene rubber of an antioxidant. After sweeping the reaction atmosphere free of oxygen with nitrogen, the solution was stirred and heated in mass at a temperature of 110° C. for a period of 10 hours and 40 minutes, then was cooled to room temperature. The partially polymerized reaction mixture contained 29 percent of polymer in the form of fine particles of sizes smaller than 3 microns. The partially polymerized reaction mixture was suspended in an equal weight of water containing 0.7 percent by weight of sodium carboxymethyl methyl cellulose, a cellulose derivative containing 0.25 —OCH₂COOH group and 1.8 —OCH₃ groups per mole of cellulose, and having an absolute viscosity of 1700 centipoises as determined for a 2 weight percent solution of the sodium carboxymethyl methyl cellulose in water at 25° C., as dispersing agent. Di-tert.-butyl peroxide in amount corresponding to 0.02 percent by weight of the used to determine the tensile strength and percent elongation for the polymer employing procedures similar to those described in ASTM D638–57T. Impact strength was determined by procedure similar to that described in ASTM D256–57T. Other test pieces were used to determine the Vicat softening point for the polymer. The molded polymer was a transparent product. The polymer had the properties:

Tensile strength, lbs./sq. in. _____ 5010
Elongation, percent _____ 45.7
Notched impact strength, ft.-lbs. _____ 2.4
Modulus×10⁵, lbs./sq. in. _____ 2.8
Vicat softening point, °C. _____ 105
Transparency _____ Fair

EXAMPLE 10

A composition was prepared by procedure similar to that employed in Example 9, except that ten parts by weight of stereospecific polybutadiene rubber having a Mooney number of 45 and consisting of over 90 percent of cis-1,4 polymer, which polymer had a broad molecular weight distribution, was used as the rubber component. The mixture was prepolymerized in mass with stirring at 110° C. for 9 hours and 15 minutes. The partially polymerized solution contained 28.8 percent by weight of polymer in the form of particles of sizes of about 5 microns and smaller.

The partially polymerized solution was suspended in an aqueous medium and was heated to complete the polymerization employing procedure similar to that employed in Example 9. The polymer had the properties:

| | |
|---|---|
| Tensile strength, lbs./sq. in. | 3430 |
| Elongation, percent | 2.2 |
| Impact strength, 75° F., ft.-lbs. | 4.4 |
| Modulus×$10^5$, lbs./sq. in. | 2.9 |
| Vicat softening point, °C. | 101 |
| Transparency | Good |

EXAMPLE 11

A composition was prepared by procedure similar to that described in Example 9, except that ten parts by weight of GR-S 1006, a synthetic rubbery copolymer of approximately 76.5 percent by weight of butadiene and 23.5 percent of styrene, having a Mooney number of 50, was used as the rubber component. The mixture was prepolymerized in mass with stirring at 110° C. for 6.5 hours. The solution contained 29.6 percent by weight of polymer in the form of particles of sizes of 5 microns and smaller. Completion of the polymerization was carried out in aqueous suspension employing procedure similar to that employed in Example 9. The polymer had the properties:

| | |
|---|---|
| Tensile strength, lbs./sq. in. | 5280 |
| Elongation, percent | 36.5 |
| Impact strength, ft.-lbs. | 3.1 |
| Modulus×$10^5$, lbs./sq. in. | 2.6 |
| Vicat softening point, °C. | 103 |
| Transparency | Excellent |

I claim:
1. A process for making a thermoplastic composition of matter which comprises: (1) heating and partially polymerizing a liquid mixture of polymerizable ingredients comprising a solution of (a) from 5 to 14 percent by weight, based on the weight of the solution, of a rubbery butadiene polymer that is soluble in monomeric styrene and contains a predominant amount of butadiene-1,3 chemically combined in the polymer molecule, (b) from 56 to 85 percent by weight of methylmethacrylate and (c) from 10 to 35 percent by weight of a monovinyl aromatic compound having the general formula:

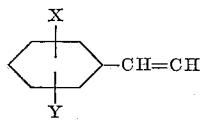

wherein X and Y are each independently selected from the group consisting of hydrogen, halogen and lower alkyl radicals containing from 1 to 4 carbon atoms, said ingredients (a) (b) and (c) being in proportions within the area defined by the lines ABCD of the drawing, while (2) subjecting the liquid mixture to a shearing agitation sufficient to maintain the polymer and the polymer being formed therein, dispersed in the liquid in the form of particles of sizes not greater than about 10 microns, until from about 5 to about 35 percent of the monomers are polymerized and the solution contains from about 20 to 40 percent by weight of polymer, then (3) continuing polymerization of the remaining monomer(s) by heating and agitating the partially polymerized solution while in admixture with and suspended in, an inert aqueous liquid medium until polymerization of the monomeric ingredients is substantially complete.

2. A process as claimed in claim 1, wherein the rubbery butadiene polymer is stereospecific polybutadiene having at least 30 percent of the polymer in the cis-1,4 configuration.

3. A process as claimed in claim 1, wherein the rubbery butadiene polymer is a stereospecific polybutadiene consisting of at least 90 percent of 1,4-polymer with from 32 to 35 percent of cis-1,4 configuration and said polybutadiene rubber is of narrow molecular weight distribution.

4. A process as claimed in claim 1, wherein the rubbery butadiene polymer is a stereospecific copolymer of approximately 75 percent by weight of butadiene and about 25 percent of styrene.

5. A process according to claim 1 wherein the vinyl aromatic compound is styrene.

6. A process according to claim 1 wherein the aqueous liquid medium contains sodium carboxymethyl methyl cellulose.

References Cited by the Examiner

UNITED STATES PATENTS

| | | | |
|---|---|---|---|
| 2,694,692 | 11/1954 | Amos et al. | 260—880 |
| 2,862,906 | 12/1958 | Stein et al. | 260—880 |
| 3,029,223 | 4/1962 | Hibbard | 260—880 |
| 3,047,534 | 7/1962 | Dyer et al. | 260—880 |
| 3,129,199 | 4/1964 | Lunk | 260—880 |
| 3,178,489 | 4/1965 | Lunk et al. | 260—880 |

FOREIGN PATENTS

| | | |
|---|---|---|
| 1,273,982 | 9/1961 | France. |

SAMUEL H. BLECH, *Primary Examiner.*

MURRAY TILLMAN, *Examiner.*

G. F. LESMES, *Assistant Examiner.*